US008695084B2

(12) United States Patent
Chauhan et al.

(10) Patent No.: US 8,695,084 B2
(45) Date of Patent: *Apr. 8, 2014

(54) INFERENCING DATA TYPES OF MESSAGE COMPONENTS

(75) Inventors: Abhishek Chauhan, Los Gatos, CA (US); Rajiv Mirani, Los Gatos, CA (US); Prince Kohli, Santa Clara, CA (US); Namit Sikka, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/212,068

(22) Filed: Aug. 17, 2011

(65) Prior Publication Data

US 2012/0216274 A1 Aug. 23, 2012

Related U.S. Application Data

(63) Continuation of application No. 12/569,006, filed on Sep. 29, 2009, now Pat. No. 8,011,009, which is a continuation of application No. 10/782,529, filed on Feb. 18, 2004, now Pat. No. 7,617,531.

(51) Int. Cl.
*H04L 29/06* (2006.01)

(52) U.S. Cl.
USPC .................................. 726/13; 726/22; 726/27

(58) Field of Classification Search
USPC ............................. 726/11, 12, 13, 22, 26, 27
See application file for complete search history.

(56) References Cited

U.S. PATENT DOCUMENTS

| 5,204,897 | A |   | 4/1993  | Wyman                    |
|-----------|---|---|---------|--------------------------|
| 5,297,239 | A | * | 3/1994  | Kurosawa et al. ... 706/59 |
| 5,361,353 | A | * | 11/1994 | Carr et al. ... 719/313   |
| 5,423,041 | A | * | 6/1995  | Burke et al. ... 717/117  |
| 5,481,717 | A | * | 1/1996  | Gaboury ... 717/126       |
| 5,596,745 | A |   | 1/1997  | Lai et al.                |
| 5,740,323 | A | * | 4/1998  | Nomura et al. ... 706/13  |
| 5,771,034 | A |   | 6/1998  | Gibson                   |
| 5,838,906 | A |   | 11/1998 | Doyle et al.             |
| 5,862,325 | A |   | 1/1999  | Reed et al.              |
| 5,878,144 | A |   | 3/1999  | Aucsmith et al.          |
| 5,963,932 | A | * | 10/1999 | Jakobsson et al. ... 1/1  |
| 5,987,517 | A | * | 11/1999 | Firth et al. ... 709/230  |

(Continued)

OTHER PUBLICATIONS

Farrow, R., "CSI 1997 Firewalss Matrix [An Analaysis of Current Firewall Technologies]", Rik Farrow's 1997 Firewall Product Analysis; www.gocsi.com/farrowpa.htm; Dec. 23, 2003, 5 pages.

(Continued)

*Primary Examiner* — David Garcí Cervetti
(74) *Attorney, Agent, or Firm* — Foley & Lardner LLP; Christopher J. McKenna

(57) ABSTRACT

A method of a device for filtering messages routing across a network includes extracting, by a filter configured on the device, a plurality of message components from messages received via a network. The plurality of message components is identified as having at least a field name in common, including a first field name. A learning engine configured on the device creates a list of data types for values of the first field name. The list includes one or more data types of a value of the first field name identified for each of the plurality of message components. The learning engine determines a most restrictive data type from the list of data types for the values of the first field name of the plurality of message components.

20 Claims, 4 Drawing Sheets

(56) References Cited

U.S. PATENT DOCUMENTS

| | | | |
|---|---|---|---|
| 6,014,518 A * | 1/2000 | Steensgaard | 717/154 |
| 6,023,692 A | 2/2000 | Nichols | |
| 6,072,942 A * | 6/2000 | Stockwell et al. | 709/206 |
| 6,088,717 A | 7/2000 | Reed et al. | |
| 6,167,449 A * | 12/2000 | Arnold et al. | 709/227 |
| 6,216,131 B1 * | 4/2001 | Liu et al. | 1/1 |
| 6,243,753 B1 | 6/2001 | Machin et al. | |
| 6,253,188 B1 | 6/2001 | Witek et al. | |
| 6,256,773 B1 | 7/2001 | Bowman-Amuah | |
| 6,289,382 B1 | 9/2001 | Bowman-Amuah | |
| 6,324,647 B1 | 11/2001 | Bowman-Amuah | |
| 6,332,163 B1 | 12/2001 | Bowman-Amuah | |
| 6,339,832 B1 | 1/2002 | Bowman-Amuah | |
| 6,345,288 B1 | 2/2002 | Reed et al. | |
| 6,363,392 B1 | 3/2002 | Halstead et al. | |
| 6,370,573 B1 | 4/2002 | Bowman-Amuah | |
| 6,381,736 B1 * | 4/2002 | Klotz et al. | 717/114 |
| 6,405,364 B1 | 6/2002 | Bowman-Amuah | |
| 6,424,958 B1 * | 7/2002 | Pappalardo et al. | 706/8 |
| 6,427,234 B1 * | 7/2002 | Chambers et al. | 717/140 |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,463,470 B1 | 10/2002 | Mohaban et al. | |
| 6,466,940 B1 * | 10/2002 | Mills | 1/1 |
| 6,477,529 B1 * | 11/2002 | Mousseau et al. | 1/1 |
| 6,477,580 B1 | 11/2002 | Bowman-Amuah | |
| 6,477,665 B1 | 11/2002 | Bowman-Amuah | |
| 6,484,312 B1 * | 11/2002 | Morrison | 717/146 |
| 6,496,833 B1 * | 12/2002 | Goldberg et al. | 1/1 |
| 6,496,850 B1 | 12/2002 | Bowman-Amuah | |
| 6,502,102 B1 | 12/2002 | Haswell et al. | |
| 6,502,213 B1 | 12/2002 | Bowman-Amuah | |
| 6,505,230 B1 | 1/2003 | Mohan et al. | |
| 6,523,027 B1 | 2/2003 | Underwood | |
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,570,587 B1 | 5/2003 | Efrat et al. | |
| 6,571,282 B1 | 5/2003 | Bowman-Amuah | |
| 6,578,068 B1 | 6/2003 | Bowman-Amuah | |
| 6,584,507 B1 | 6/2003 | Bradley et al. | |
| 6,584,569 B2 * | 6/2003 | Reshef et al. | 726/25 |
| 6,598,186 B1 * | 7/2003 | McGuire et al. | 714/48 |
| 6,601,192 B1 | 7/2003 | Bowman-Amuah | |
| 6,601,233 B1 | 7/2003 | Underwood | |
| 6,601,234 B1 | 7/2003 | Bowman-Amuah | |
| 6,606,660 B1 | 8/2003 | Bowman-Amuah | |
| 6,609,128 B1 | 8/2003 | Underwood | |
| 6,611,262 B1 * | 8/2003 | Suzuki | 345/419 |
| 6,615,199 B1 | 9/2003 | Bowman-Amuah | |
| 6,615,253 B1 | 9/2003 | Bowman-Amuah | |
| 6,629,081 B1 | 9/2003 | Cornelius et al. | |
| 6,633,878 B1 | 10/2003 | Underwood | |
| 6,636,242 B2 * | 10/2003 | Bowman-Amuah | 715/764 |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,658,625 B1 * | 12/2003 | Allen | 715/236 |
| 6,662,357 B1 | 12/2003 | Bowman-Amuah | |
| 6,671,689 B2 | 12/2003 | Papierniak | |
| 6,681,385 B1 * | 1/2004 | Steensgaard et al. | 717/133 |
| 6,684,222 B1 | 1/2004 | Cornelius et al. | |
| 6,691,232 B1 | 2/2004 | Wood et al. | |
| 6,691,301 B2 | 2/2004 | Bowen | |
| 6,701,345 B1 | 3/2004 | Carley et al. | |
| 6,701,514 B1 * | 3/2004 | Haswell et al. | 717/115 |
| 6,704,873 B1 | 3/2004 | Underwood | |
| 6,714,219 B2 | 3/2004 | Lindhorst et al. | |
| 6,715,145 B1 | 3/2004 | Bowman-Amuah | |
| 6,718,380 B1 | 4/2004 | Mohaban et al. | |
| 6,718,535 B1 | 4/2004 | Underwood | |
| 6,732,331 B1 | 5/2004 | Alexander | |
| 6,742,015 B1 | 5/2004 | Bowman-Amuah | |
| 6,757,710 B2 | 6/2004 | Reed | |
| 6,763,017 B1 | 7/2004 | Buckingham et al. | |
| 6,772,410 B1 * | 8/2004 | Komatsu et al. | 717/124 |
| 6,792,458 B1 * | 9/2004 | Muret et al. | 709/224 |
| 6,804,701 B2 * | 10/2004 | Muret et al. | 709/203 |
| 6,820,267 B2 * | 11/2004 | Christensen et al. | 719/315 |
| 6,842,906 B1 | 1/2005 | Bowman-Amuah | |
| 6,847,892 B2 | 1/2005 | Zhou et al. | |
| 6,850,252 B1 | 2/2005 | Hoffberg | |
| 6,874,151 B1 * | 3/2005 | Dean | 719/330 |
| 6,889,379 B1 | 5/2005 | Lindhorst et al. | |
| 6,904,449 B1 * | 6/2005 | Quinones | 709/203 |
| 6,907,546 B1 | 6/2005 | Haswell et al. | |
| 6,917,972 B1 * | 7/2005 | Basko et al. | 709/224 |
| 6,952,425 B1 * | 10/2005 | Nelson | 370/429 |
| 6,954,736 B2 | 10/2005 | Menninger et al. | |
| 6,957,256 B1 | 10/2005 | Bradley et al. | |
| 6,981,143 B2 * | 12/2005 | Mullen et al. | 713/166 |
| 6,981,215 B1 | 12/2005 | Lindhorst et al. | |
| 6,981,262 B1 | 12/2005 | DeMello et al. | |
| 6,993,707 B2 * | 1/2006 | Baker et al. | 715/241 |
| 6,996,720 B1 | 2/2006 | DeMello et al. | |
| 6,996,813 B1 * | 2/2006 | Sokolov et al. | 717/148 |
| 7,000,107 B2 * | 2/2006 | Hewett et al. | 713/164 |
| 7,013,329 B1 | 3/2006 | Paul et al. | |
| 7,017,189 B1 | 3/2006 | DeMello et al. | |
| 7,039,606 B2 | 5/2006 | Hoffman et al. | |
| 7,051,080 B1 | 5/2006 | Paul et al. | |
| 7,051,342 B2 * | 5/2006 | Christensen et al. | 719/330 |
| 7,054,837 B2 | 5/2006 | Hoffman et al. | |
| 7,069,234 B1 | 6/2006 | Cornelius et al. | |
| 7,072,843 B2 | 7/2006 | Menninger et al. | |
| 7,089,542 B2 * | 8/2006 | Brand et al. | 717/143 |
| 7,100,195 B1 | 8/2006 | Underwood | |
| 7,106,725 B2 | 9/2006 | Andaker et al. | |
| 7,107,338 B1 * | 9/2006 | Nareddy et al. | 709/224 |
| 7,117,504 B2 * | 10/2006 | Smith et al. | 719/328 |
| 7,120,596 B2 | 10/2006 | Hoffman et al. | |
| 7,120,902 B2 * | 10/2006 | Flanagan et al. | 717/130 |
| 7,127,432 B2 * | 10/2006 | Rubin et al. | 705/74 |
| 7,130,812 B1 | 10/2006 | Iyer et al. | |
| 7,137,077 B2 | 11/2006 | Iwema et al. | |
| 7,139,999 B2 | 11/2006 | Bowman-Amuah | |
| 7,167,844 B1 | 1/2007 | Leong et al. | |
| 7,171,379 B2 | 1/2007 | Menninger et al. | |
| 7,177,949 B2 | 2/2007 | Bracewell et al. | |
| 7,188,183 B1 | 3/2007 | Paul et al. | |
| 7,188,216 B1 * | 3/2007 | Rajkumar et al. | 711/118 |
| 7,191,163 B2 * | 3/2007 | Herrera et al. | 706/47 |
| 7,194,444 B1 | 3/2007 | Nichols | |
| 7,194,516 B2 | 3/2007 | Giacobbe et al. | |
| 7,197,502 B2 | 3/2007 | Feinsmith | |
| 7,206,805 B1 | 4/2007 | McLaughlin, Jr. | |
| 7,210,095 B1 | 4/2007 | Mor | |
| 7,237,265 B2 * | 6/2007 | Reshef et al. | 726/25 |
| 7,272,853 B2 * | 9/2007 | Goodman et al. | 726/13 |
| 7,284,242 B2 * | 10/2007 | Vion-Dury | 717/159 |
| 7,284,274 B1 * | 10/2007 | Walls et al. | 726/25 |
| 7,287,243 B2 * | 10/2007 | Dollin et al. | 717/126 |
| 7,293,012 B1 * | 11/2007 | Solaro et al. | 1/1 |
| 7,302,569 B2 * | 11/2007 | Betz et al. | 713/167 |
| 7,313,822 B2 * | 12/2007 | Ben-Itzhak | 726/24 |
| 7,360,025 B1 * | 4/2008 | O'Connell et al. | 711/133 |
| 7,409,708 B2 * | 8/2008 | Goodman et al. | 726/13 |
| 7,418,720 B2 * | 8/2008 | Dean | 719/330 |
| 7,454,479 B2 * | 11/2008 | Alexander et al. | 709/217 |
| 7,461,336 B1 * | 12/2008 | Abramson et al. | 715/237 |
| 7,464,264 B2 * | 12/2008 | Goodman et al. | 713/154 |
| 7,606,255 B2 | 10/2009 | Smith | |
| 7,822,587 B1 | 10/2010 | Krimstock et al. | |
| 2001/0056444 A1 * | 12/2001 | Ide et al. | 707/513 |
| 2002/0010855 A1 * | 1/2002 | Reshef et al. | 713/164 |
| 2002/0042821 A1 * | 4/2002 | Muret et al. | 709/223 |
| 2002/0049788 A1 | 4/2002 | Lipkin et al. | |
| 2002/0083178 A1 * | 6/2002 | Brothers | 709/226 |
| 2002/0091701 A1 * | 7/2002 | Wall et al. | 707/100 |
| 2002/0104023 A1 * | 8/2002 | Hewett et al. | 713/201 |

(56) References Cited

U.S. PATENT DOCUMENTS

| | | | |
|---|---|---|---|
| 2002/0112152 A1 | 8/2002 | VanHeyningen et al. | |
| 2002/0115407 A1 | 8/2002 | Thompson et al. | |
| 2002/0124113 A1* | 9/2002 | Gargya et al. | 709/246 |
| 2002/0133806 A1* | 9/2002 | Flanagan et al. | 717/123 |
| 2002/0147805 A1* | 10/2002 | Leshem et al. | 709/223 |
| 2002/0157023 A1* | 10/2002 | Callahan et al. | 713/201 |
| 2002/0199035 A1* | 12/2002 | Christensen et al. | 709/330 |
| 2003/0023845 A1 | 1/2003 | VanHeyningen | |
| 2003/0023873 A1* | 1/2003 | Ben-Itzhak | 713/201 |
| 2003/0110161 A1* | 6/2003 | Schneider | 707/3 |
| 2003/0131081 A1* | 7/2003 | Nareddy et al. | 709/220 |
| 2003/0140312 A1 | 7/2003 | Mohan et al. | |
| 2003/0144988 A1* | 7/2003 | Nareddy et al. | 707/1 |
| 2003/0154296 A1* | 8/2003 | Noguchi et al. | 709/229 |
| 2003/0188001 A1 | 10/2003 | Eisenberg et al. | |
| 2003/0226038 A1* | 12/2003 | Raanan et al. | 713/201 |
| 2003/0229605 A1* | 12/2003 | Herrera et al. | 706/47 |
| 2003/0233581 A1* | 12/2003 | Reshef et al. | 713/201 |
| 2004/0015463 A1* | 1/2004 | Herrera et al. | 706/47 |
| 2004/0131020 A1 | 7/2004 | Smith | |
| 2004/0148592 A1* | 7/2004 | Vion-Dury | 717/152 |
| 2004/0181750 A1* | 9/2004 | Lection et al. | 715/513 |
| 2004/0260922 A1* | 12/2004 | Goodman et al. | 713/154 |
| 2004/0268234 A1* | 12/2004 | Sampathkumar et al. | 715/513 |
| 2005/0004942 A1 | 1/2005 | Madsen et al. | |
| 2005/0022031 A1* | 1/2005 | Goodman et al. | 713/201 |
| 2005/0027799 A1* | 2/2005 | Tsutsui et al. | 709/204 |
| 2005/0044409 A1* | 2/2005 | Betz et al. | 713/201 |
| 2005/0080850 A1 | 4/2005 | Salesky et al. | |
| 2005/0086670 A1* | 4/2005 | Christensen et al. | 719/330 |
| 2005/0102277 A1* | 5/2005 | Hoeft et al. | 707/3 |
| 2005/0102364 A1* | 5/2005 | Ozzie et al. | 709/207 |
| 2005/0149726 A1 | 7/2005 | Joshi et al. | |
| 2005/0165889 A1* | 7/2005 | Muret et al. | 709/203 |
| 2005/0188270 A1* | 8/2005 | Dollin et al. | 714/38 |
| 2006/0041635 A1* | 2/2006 | Alexander et al. | 709/218 |
| 2006/0068755 A1* | 3/2006 | Shraim et al. | 455/410 |
| 2006/0085457 A1 | 4/2006 | Gelfand | |
| 2006/0130019 A1* | 6/2006 | Cool et al. | 717/140 |
| 2006/0200449 A1* | 9/2006 | Pauws | 707/3 |
| 2007/0192853 A1* | 8/2007 | Shraim et al. | 726/22 |
| 2007/0294762 A1* | 12/2007 | Shraim et al. | 726/22 |
| 2007/0299915 A1* | 12/2007 | Shraim et al. | 709/206 |
| 2008/0222652 A1 | 9/2008 | Lambert et al. | |

OTHER PUBLICATIONS

Notice of allowance for U.S. Appl. No. 10/782,529 dated Jun. 30, 2009.

Notice of Allowance on U.S. Appl. No. 12/569,006 dated Apr. 25, 2011.

Office Action for U.S. Appl. No. 10/782,529 dated Mar. 5, 2008.

Office Action for U.S. Appl. No. 10/782,529 dated Sep. 3, 2008.

Office Action for U.S. Appl. No. 10/782,529 dated Dec. 19, 2008.

Office Action on U.S. Appl. No. 12/569,006 dated Nov. 18, 2010.

Ranum, Marcus J., Thinking About Firewalls; Trusted Information Systems, Inc., Glenwood Maryland, 10 pages.

Reumann, John, et al. "Adaptive Packet Filters;" Department of Electrical Engineering and Computer Science; The University of Michigan, Ann Arbor, MI 48109-2122; 5 pages.

* cited by examiner

INFERENCING DATA TYPES OF MESSAGE COMPONENTS

RELATED APPLICATIONS

This present application claims priority to and is a continuation of U.S. patent application Ser. No. 12/569,006, entitled "INFERENCING DATA TYPES OF MESSAGE COMPONENTS", filed Sep. 29, 2009, and issued as U.S. Pat. No. 8,011,009, which claims priority to and is a continuation of U.S. patent application Ser. No. 10/782,529, entitled "INFERENCING DATA TYPES OF MESSAGE COMPONENTS", filed Feb. 18, 2004, and issued as U.S. Pat. No. 7,617,531, both of which are incorporated herein by reference in their entirety for all purposes.

FIELD OF DISCLOSURE

The present invention relates generally to data type inferencing of scalar objects, and more particularly, to one application of inferencing data types of message components to generate rules which block illegitimate messages from passing through application proxies and gateways.

BACKGROUND

Corporations are rapidly deploying web-based applications to automate business processes and to facilitate real-time interaction with customers, business partners and employees. Highly vulnerable to malicious hackers, web applications provide an entry point through which sensitive data can be accessed and stolen. Given the vulnerability of web applications, establishing a web application protection is critical for any enterprise that is exposing sensitive data or transaction systems over the Internet.

Firewalls are an essential component in a corporate entity's network security plan. They represent a security enforcement point that separates a trusted network from an untrusted network. Firewalls determine which traffic should be allowed and which traffic should be disallowed based on a predetermined security policy.

Firewall systems designed to protect web applications are known. They are commonly implemented as application proxies or application gateways. An application proxy is an application program that runs on a firewall system between two networks and acts as an intermediary between a web client and a web server. When client messages are received at the firewall, the final server destination address is determined by the application proxy software. The application proxy translates the address, performs additional access control checking, and connects to the server on behalf of the client. An application proxy authenticates users and determines whether user messages are legitimate.

Application proxies and gateways, however, are not designed to determine whether messages and their components are of a proper data type. This functionality is expected to be performed by web applications. For example, when an XML message is sent across a network, a web application extracts components of the message, typically in the form of field name-value pairs. The web application then determines whether the values are of an expected data type using type-checking rules as is well known in the art. If the web application determines that a value is not of a valid data type, as specified by the application, the web server does not process the message.

Existing methods that rely on verifying data types of message components, however, have a number of shortcomings.

First, since application proxies and gateways are not configured to verify the data types of message components, messages containing components of an invalid data type will still be allowed to pass through application proxies and/or security gateways. Since some of these messages are more likely to represent malicious attacks rather than legitimate requests, failure to verify data types by application proxies and gateways results in allowing illegitimate traffic to enter web servers.

Secondly, the schemes used by a web server to verify data types of message components are manually provided by developers. Therefore, security policies are not always consistently applied to all incoming traffic received by web applications. Failure to check for valid data types of incoming traffic can result in buffer overflows, or other application security breaches. Further, these approaches may not reflect the dynamic behavior of the application traffic. In addition, the security policies are often overly broad. For example, if a policy specifies that "String" is a data type of a password field, then any alphanumeric value entered into the password field will satisfy this data type. However, if a policy specifies that "INT" is a data type of the password field, then only integers can be entered into the password field. Thus, data type "String" is a more broad (or less restrictive) data type than "INT". Requiring a data type of the password field to be "INT" instead of "String" reduces a number of options presented to an intruder with respect to guessing a proper data type of the password field. Requiring a data type of the password field to be "String", in contrast, provides ample opportunities for an intruder to correctly guess the data type of the password field, thereby increasing a number of illegitimate messages entering a web application.

Accordingly, what is needed is a technique that automatically learns characteristics of the application behavior to generate rules that would prevent malicious traffic from passing through application proxies and gateways. What is also needed is a technique that defines a data type of a message component as narrowly as possible, thereby making it more difficult for an intruder to perpetrate an attack while conforming to the proper data type of a message component.

SUMMARY

A security gateway receives messages and extracts components thereof, typically in the form of field name-value pairs. The security gateway determines a data type of the values for individual field names to infer the most restrictive data type of the values for that field. The security gateway may then generates rules, which would block messages that do not have values that match the most restrictive data type. Since the most restrictive data type defines a data type of values for the field as narrowly as possible, the generated rules will make it more difficult for an intruder to generate a successful attack while confirming to a valid data type of a value. For example, if the gateway only allows values of an integer data type to pass, an attack that relies on buffer overflows by sending a large amount of shellcode in a field will not succeed because the data type of the shellcode does not match the required integer data type.

Since messages that have values that do not match the most restrictive data type are likely to represent malicious attacks, the more narrowly the data type of values is defined, the greater the number of illegitimate messages that will be blocked from passing through application proxies and gateways. Accordingly, the generated rules will prevent a maximum number of illegitimate messages from passing through application proxies and gateways.

In one embodiment, initially, messages are received by a learning engine. Examples of the received messages are URL requests, forms, and other client-server communications. The learning engine extracts message components, such as URL components and field name-value pairs. In the case of field-type messages, such a XML-formatted messages, values for the same component/field name for the messages in the sample are provided as an input to a scalar data type inferencing algorithm as a set of keywords (k). The algorithm determines for a set of keywords a most restrictive data type of the values.

The algorithm creates a Directed Acyclic Graph (DAG) of a data type set. Examples of the data types in a data type set are known data types, such as "Date," "Time," "INT," "String," and user-defined data types, such as "Word," "URL-PATH", and "Credit Card." Some data types in a data type set are in a "contains" type relationship such that data type Di is contained within Dj if every keyword of type Di is also of type Dj. It is said that Di is a more restrictive data type than Dj. The containment relationships provide an ordering amongst at least some of the data types.

Each node in the DAG is associated with a data type in the data type set. The algorithm traverses the DAG using a breadth first search algorithm to select a node associated with a most restrictive data type for a given set of keywords.

The algorithm then creates a list of candidates for a most restrictive data type. Initially, this list is empty. The algorithm then creates a queue using a breadth-first search algorithm and populates the queue with the first data type from the DAG. The algorithm determines whether the first data type is an eligible candidate. To this end, the algorithm determines a match factor of the first data type. If the match factor exceeds a threshold, then the data type is an eligible candidate. Otherwise, the algorithm populates the queue with a next data type.

The algorithm then looks at all child data types of the eligible data type and computes a match factor for each child data type. The match factor is a fraction of keywords (field names) in a set of keywords that have values that match a particular data type. For example, if there are 100 instances of values for the field name "Password" and 60 of them are strings, and 40 of them are integers, then the match factor for the string data type is 0.60, and the match factor for the integer data type is 0.40.

If a match factor of the child data type of the eligible data type exceeds a threshold, then the eligible data type is not added to the list of candidate. If the eligible data type has no children with a match factor exceeding a threshold, then the eligible data type is added to the list of candidates. If the child data type with a match factor exceeding a threshold is not on the list of candidates and is not in the queue, the algorithm adds the child data type to the queue.

Thus, the algorithm infers a most restrictive data type of the set of keywords by determining data types of the keywords. Once the most restrictive data type for values of the same field name is identified, different applications may be made of the data type information. In one embodiment, the learning engine generates a rule, which would allow messages having values for a field name that match the most restrictive data type to pass through the security gateway. The learning engine provides the generated rules to a message filter, which applies the rules to determine whether to allow messages.

In an alternative embodiment, when the learning engine receives URL messages for analyzing, the learning engine extracts URL components from the messages. The learning engine determines, for URL components at the same level, with the same root URL component, a most restrictive data type of the URL component. The learning 6 engine determines a most restrictive data type using a scalar data type inferencing algorithm. The learning engine generates a rule which would allow messages with the URL components that match the most restrictive data type.

DETAILED DESCRIPTION

1. System Architecture Overview

Figure 1:
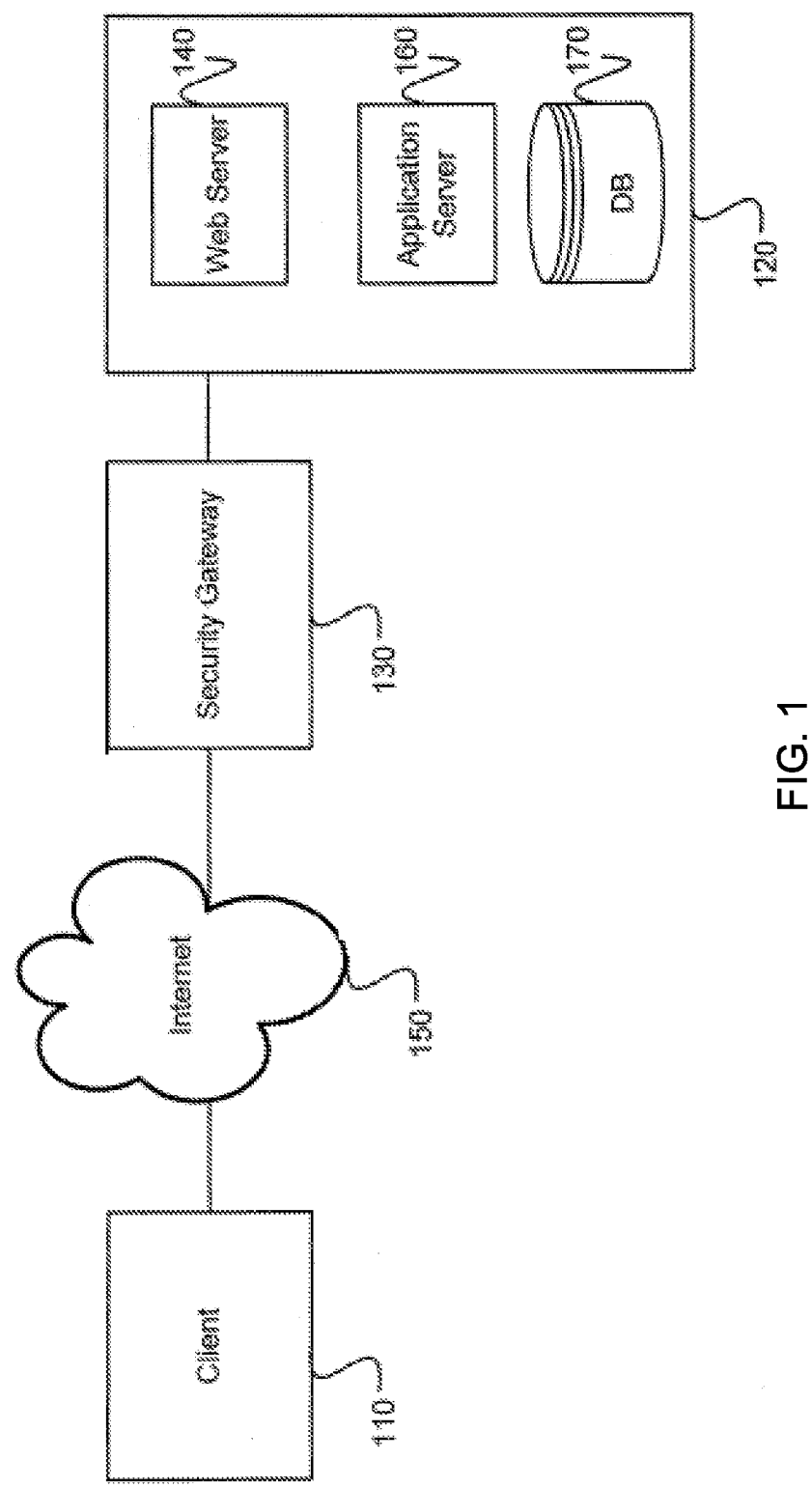
FIG. 1 is a block diagram of environment in which the invention operates.

FIG. 1 is a block diagram of an environment 100 in which the invention operates. The environment 100 includes a client system 110 and a server system 120 connected by a communication network 150. A security gateway 130 is interposed between and connected to client 110 and server 120. Although this invention is described in the context of the client-server architecture, it should be understood that the invention can be implemented in any other suitable architecture, such as a peer-to-peer architecture where each system 110 and 120 can be a client and a server.

As used herein, the term "server system" 120 simply denotes those aspects of the software program associated with a remote computer, as well as underlying operating system and hardware support. As will be understood by those of skill in the art, 7 a server system 120 within the context of the present invention can comprise components of the software program, as well as components of the operating system of a remote computer and hardware components of a remote computer. Server system 120 may include a web infrastructure, such as a web server 140, an application server 160, and a database 170. Web server 140 is a computer running software for serving content across the Internet, such as for example Microsoft Internet Information Server (HS), or Apache. Web server 140 responds to requests received from client system 110 by transmitting HTML pages across the Internet for display by a web browser (not shown) that is running on client system 110. Application server 160 is a program that handles all application operations between users an enterprise's backend business applications or databases. Database 170, in turn, stores all data relevant to the enterprises' operations. The server system 120 may comprise one or more computers for implementing the above described functionality and services.

As used herein, the term client system 110 simply denotes those aspects of the software program associated with a user's computer, as well as underlying operating system and hardware support. As will be understood by those of skill in the art, a client system 110 within the context of the present invention can comprise components of the software program, as well as components of the operating system of a user's computer and hardware components of a user's computer. Client system 110 includes a web browsing functionality. While FIG. 1 illustrates a single client system 110, it is appreciated that in actual practice there will be any number of client systems 110 that communicate with the server system 120.

Communication network 150 can be the Internet, and particularly, the World Wide Web portion thereof. However, it will also be appreciated that communication network 150 can be any known communication network.

In one implementation, security gateway 130 operates as a proxy in that it is installed directly in front of server 120. In yet another implementation, security gateway 130 operates as a gateway between the public Internet and an internal network (not shown), such as a WAN, or LAN.

Security gateway 130 runs the following modules: a message filter 210, a learning engine 230, and memory 250. As used herein, the term "module" refers to computer program logic and/or any hardware to provide the functionality attributed to the module. These modules are described in more detail in reference to FIG. 2.

Figure 2:
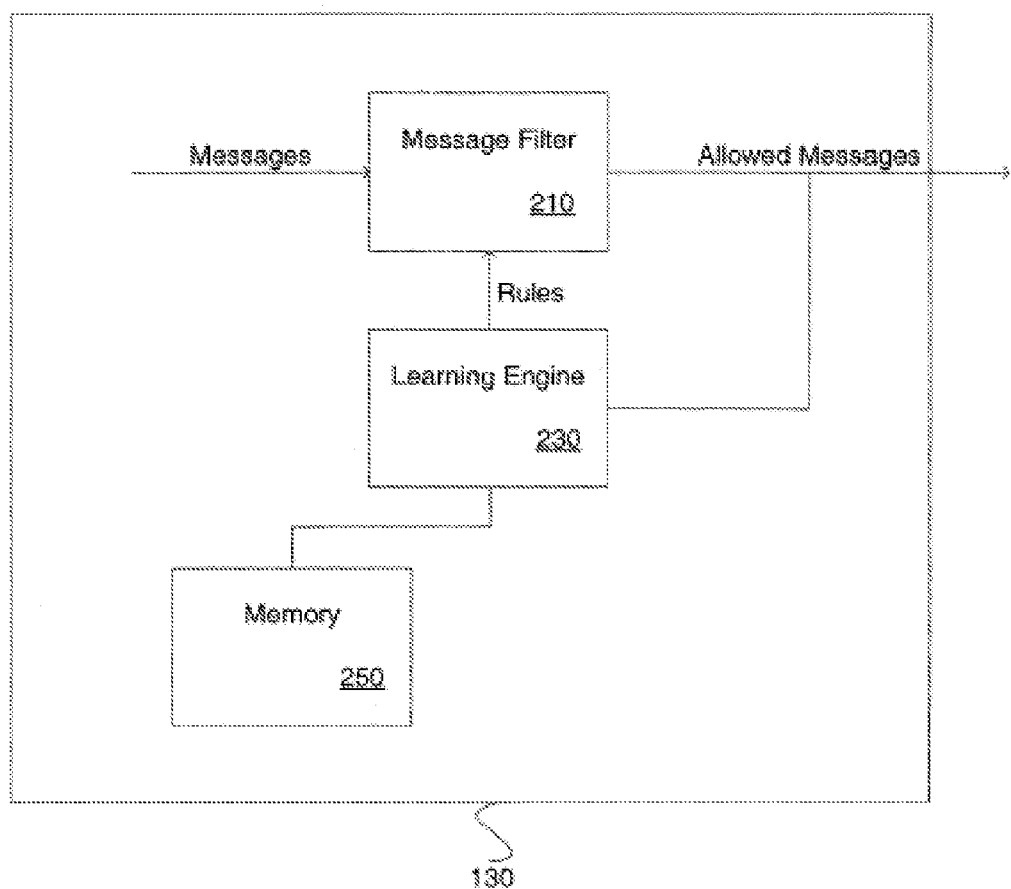
FIG. 2 is a block diagram of functional components of a security gateway shown in FIG. 1.

Referring now to FIG. 2, message filter 210 is adapted to perform filtering of incoming messages. As described above, examples of the received messages are a web form, a URL, and other client-server communications. Messages can include components, such as cookies, form fields, hidden fields, and URL components. Message filter 210 maintains a list of filtering rules. Message filter 210 processes rules in a list form, checking messages against the rules in order, until the message is either accepted or rejected. If no rule applies, then the default policy (either reject or accept) is applied.

In one implementation, the learning engine 230 analyzes messages accepted by message filter 210. These messages, for example, can be stored in memory 250 and provided to learning engine 230 to find a most restrictive data type. Learning engine 230 extracts components from the messages. Learning engine 230 determines a most restrictive data type for the extracted components using a scalar data type inferencing algorithm. Learning engine 230 then generates rules, which would allow messages having the components that match the most restrictive data type to pass through the security gateway 130. Learning engine 230 provides the rules to message filter 210. Message filter 210 applies generated rules to determine whether to allow messages with components that match the most restrictive data type to pass through security gateway 130.

Memory 250 stores a number of data structures. Memory 250 stores various thresholds, match factors, a message log, and a set of data types. The data types stored in memory will be described in more detail below in the "Methods of Operation" section.

2. Methods of Operation

Figure 3:
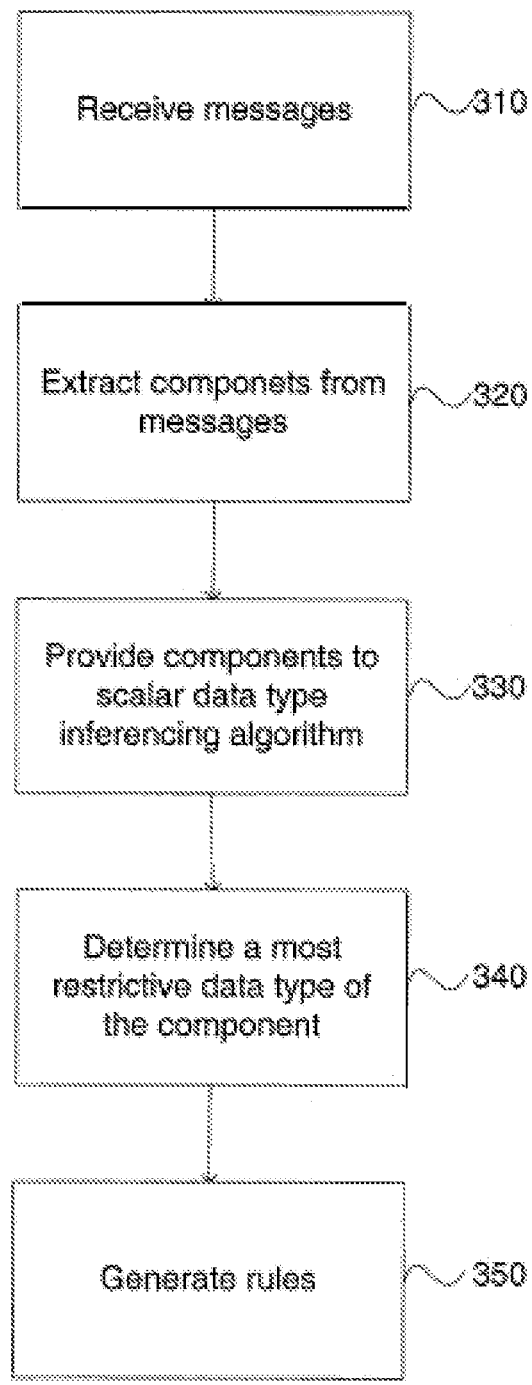
FIG. 3 is a flow chart of a method performed by the security gateway according with one embodiment.

Referring now to FIG. 3, there is shown a flowchart of a method of operation in accordance with one embodiment of the invention.

It should be noted that security gateway 130 can operate in a learning mode and an operating mode. Briefly, in the learning mode, security gateway 130 receives messages, extracts message components, and determines a most restrictive data type for the extracted message components. Security gateway 130 may then generates rules, which would allow messages having the components that match the most restrictive data type to pass through security gateway 130 and provides the rules to message filter 210. In the operating mode, security gateway 130 applies the rules to determine whether to allow messages with components that match the most restrictive data type.

Initially, learning engine 230 receives 310 messages and extracts 320 components thereof. Examples of the received messages are web forms, URL requests, and other client-server communications. Examples of message components are URL components and field name-pair values. Although the method of operation will be described in the context of XML-formatted messages, it should be understood that this description applies to other types of messages that include field-type components.

When learning engine 230 receives XML-formatted messages, it extracts components, such as field name-value pairs. For example, in the XML format, a field name-value pair is: <City_Name>San Francisco</City_Name>. Learning engine 230 extracts the field name "City_Name" and value "San Francisco." Table 1 below shows exemplary field name-value pairs extracted from a set of XML messages. In Table 1 extracted pairs are sorted by the field name.

TABLE 1

Exemplary Field Name-Value Pairs

| Field Name | Value |
|---|---|
| City_Name | San Francisco |
| City_Name | Moscow |
| City_Name | 1234 |
| City_Name | New York |
| City_Name | Paris |
| First_Name | Jane |
| First_Name | 03/02/70 |
| First_Name | Alex |
| First_Name | 353 |
| First_Name | Ken |

Values for the same component/field name are provided 330 as an input to a scalar data type inferencing algorithm a set of keywords (k). Learning engine 230 executes the data scalar type inferencing algorithm to determine, for a set of keywords, a most restrictive data type for the field name.

A. Identifying a Most Restrictive Data Type For a Set of Keywords

In the example shown in Table 1, values for the component/field name—"City Name" will be provided to the algorithm as a set of keywords: {"San Francisco," "Moscow," "1234", "New York", "Paris"}. Each keyword is a scalar object, e.g., a finite string of characters. Similarly, values for the component/field name "First Name" will be provided to the algorithm as a set of keywords: {"Jane," "03/02/70," "Alex," "353," "Ken"}.

At this point it is useful to define data types. A data type can be defined as a classification of data representation. Datatypes={D1, D2, D3 . . . Dm} is a set of datatypes. Some data types in the set of data types are known data types, such as "INT" for Integer, "CHAR" for character, "String", "Date", and "Time." Other data types are user-defined data types, such as "URLPATH", "Word", and "Credit Card".

URLPATH

Each URL string, such as "http://www.cnn.com/2004/Jan/1/sports.html" is a combination of the protocol, such as "http://", a host domain name, such as "www.cnn.com", and a directory path, such as "2004/Jan/1/sports." URLPATH is a data type that describes a directory path of a typical URL.

Word

"Word" data type is defined as a string of alphabetical characters [a-z], which is not interrupted by space or any character other than [a-z].

Credit Card

"Credit Card" is defined as a string of 16 integers.

Each datatype D is a predicate that takes a keyword as an input, and either accepts or rejects it. D(k)=True, if keyword k is of datatype D, false otherwise.

For example:

INT ("29")=True

INT ("dog")=False

Word ("dog")=True.

It is said that D(k) is true if the keyword (k) is mapped to the data type D. An alternative way of saying that D(k)=True is that K matches data type D.

Data types in a set of data types can be in a partially ordered relationship, such as a "contains" type relationship. The "contains" type relationship between two data types creates a hierarchical relationship between the two data types, such a parent-child relationship. It is said that data type Di is contained within Dj if every keyword of type Di is also of type Dj. It is said that Di is a more restrictive data type than Dj. For example, data types "Date" and "String" are in the "contains" type relationship, because every keyword that is of data type "Date" is also of data type "String." Data type "String" is a parent of data type "Date." Data type "Date," in turn, is a child of data type "String." "Date" is a more restrictive data type than "String" and data type "String" is a less restrictive data type than "Date".

It should be noted that not all data types can be in a "contains" type of relationship. For example, not all keywords of data type "Date" are of data type "INT". Similarly, not all keywords of data type "INT" are of data type "Date." Therefore, these data types are not in a hierarchical relationship.

The algorithm uses two new data types "Universe" (U) and "Null" and adds them to the set of data types. Data types "U" and "Null" have the following constraints:

U(k)=True for all keywords in a data set. In other words, all keywords in a set are of data type U; and Null (k)=False for all data types. No keywords in a set are of data type "Null." Adding new data types U and Null expands the set of data types to be {U, D1, D2, D3 . . . Dm, Null}.

Figure 4:
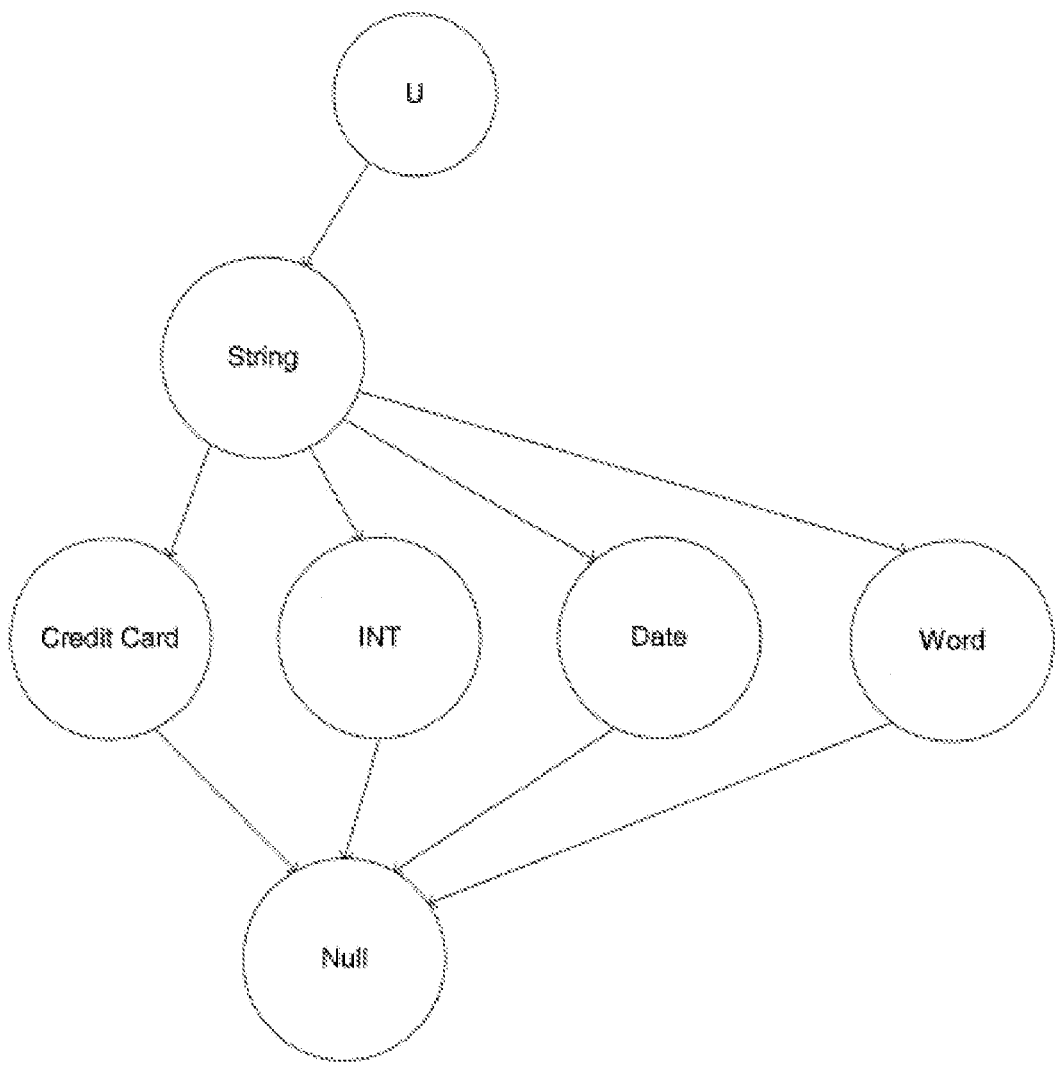
FIG. 4 is a diagram of a Directed Acyclic Graph of a data type set according to an embodiment of the present disclosure.

The algorithm creates a Directed Acyclic Graph (DAG) of the data types in a data type set, using a "contains" relationship, as shown in FIG. 4. A graph is a finite set of vertices (or nodes) connected by links called edges (or arcs). A DAG is a graph with no path which starts and ends at the same node and repeats no other node. Nodes in a DAG can be in an ancestor-descendant relationship. A DAG has a root node, which is the topmost node that has no ancestor nodes. A DAG has leaf nodes and internal nodes. An internal node is a node that has one or more child nodes. A leaf node has no children. All children of the same node are siblings.

Referring now to FIG. 4, each node in a DAG is associated with a data type in the set of data types. In FIG. 4, nodes in the DAG are associated with the following data types: "U", "Credit Card", "Date", "INT", "String", "Word" and "Null". It should be noted that the DAG shown in FIG. 3 can include any number of data types. One skilled in the art would understand that the data types shown in FIG. 4 are only exemplary data types.

As shown in FIG. 4, a node associated with the data type "U" is a root node because it does not have a parent node. A node associated with data type "Null" is a leaf node because it does not have child nodes. The rest of the nodes are internal nodes.

In any DAG, there is a directed path from data type Dj to data type Di if Dj contains Di. As shown in FIG. 4, data types "String" and "Credit Card" are in a "contains" relationship because every keyword that is of data type "Credit Card" is also of data type "String." It is also said that "Credit Card" is a more restrictive data type than "String".

The algorithm traverses the DAG using a breadth-first search algorithm to select a node associated with a most restrictive data type for a given set of keywords. The breadth-first search algorithm is a search algorithm that explores all child nodes before exploring descendants of the first child node.

Initially, the algorithm creates a queue of all data types in the DAG based on the breadth-first search algorithm and populates the queue with the first data type. The algorithm then creates a list of candidates. Each candidate on the list is a most restrictive data type. It should be noted that initially the list of candidates is empty. The list is populated as the most restrictive data types are identified.

The algorithm then dequeues the first data type from the queue and determines whether the first data type is eligible potential candidate. The data type is eligible if its match factor exceeds a threshold. A match factor is a fraction of keywords in the set of keywords that are of a particular data type. The match factor is computed by iterating over the keywords and counting a number of keywords that match a particular data type. The match factor is a fraction of this number over the total number of keywords in the set. In one implementation, to determine whether a keyword matches a particular data type, learning engine 230 makes an operating system call. An operating system determines whether a keyword in a set of keywords is of a particular data type and returns the result to learning engine 230. In another implementation, learning engine 230 runs a type-checking engine (not shown) which determines whether a keyword is of a particular data type.

If the match factor of the eligible data type does not exceed a threshold, the algorithm populates the queue with a next data type.

The algorithm looks at all child data types of the eligible data type and computes a match factor for each child data type. If a match factor of the child data type of the eligible data type exceeds a threshold, then the eligible data type is not added to the list of candidate. If the child data type with a match factor exceeding a threshold has not been previously considered, e.g., the child data type is not on the list of candidates and is not in the queue, the algorithm then adds the child data type to the queue.

If the eligible data type has no children with a match factor exceeding a threshold, then the eligible data type is added to the list of candidates.

It should be noted that if the list of candidates includes more than one most restrictive data type, the algorithm picks any data type on the list. Alternatively, the algorithm selects the lowest order data type in the DAG; alternatively, the algorithm can select both data types as acceptable alternatives, depending on the particular application for which the data type information is to be used and utilize other input, such as a user input, or the context of variables.

The above constraints are representative of one known implementation of an algorithm for selecting a most restrictive data type. It should be noted that there are different variations of constraints used by the algorithm.

At this point it is useful to define a threshold T. T can be any fraction between 0% and 100%. If T=100%, then the most restrictive data type is the data type that matches all keywords in a set.

The following example illustrates the operation of the algorithm. Assuming the following values for the component/field name "City Name" were provided to the algorithm as a set of keywords: {"San Francisco," "Moscow," "1234," "New York," "Paris"}. This set of keywords includes 5 keywords.

The algorithm traverses the DAG using the breadth-first search algorithm and populates a queue with data types from the DAG traversed using the breadth-first search algorithm. Thus, the algorithm populates the queue with the root data type "U".

The algorithm dequeues the first data type to determine whether "U" is an eligible potential candidate to be a most restrictive data type. The Mf(U)=100%. Therefore, "U" is an eligible candidate. The algorithm then calculates a match factor for all children of "U". "U" has one child, "String." Mf (String)=100% because all keywords in the set are of a data type "String." The algorithm compares the Mf to the threshold of, for example, 75%. This means that the match factor of a data type has to be at least 75% in order to be selected. Since Mf (String) exceeds the threshold, "U" is not a potential candidate. The algorithm then adds "String" to the queue.

The algorithm then calculates a match factor for all children of "String" as follows:
- Mf (Word)=80% because four keywords "San Francisco", "Moscow", and "New York" are of a data type "Word." The algorithm places "Word" in the queue.
- Mf (INT)=20% because only one keyword "1234" is of a data type "INT".
- Mf (Credit Card)=0% because none of the keywords are of data type "Credit Card." Mf (Date)=0% because none of the keywords are of data type "Date."

Since Mf(Word) exceeds the threshold, "String" is not added to the list of candidates. "Word" is added to the queue.

The algorithm then analyzes data type "Word." Since Mf(Word) exceeds the threshold, "Word" is eligible data type. "Word" does not have any children with a match factor exceeding the threshold, therefore this data type is placed 340 in the list of candidates selected as a most restrictive data type for the field from which these values were extracted.

Data types "INT", "Credit Card", and "Date" are not eligible data types since their Mf individually do not exceed the threshold.

Thus, the most restrictive data type for a keyword set {"San Francisco," "Moscow," "1234", "New York", "Paris"} is "Word" since at least 75% of keywords match to this data type and it does not have children with a match factor exceeding the threshold. Thus, the most restrictive data type defines a data type of keywords in the set as narrowly as possible.

Thus, the algorithm takes a set of keywords, determines a data type of keywords in the set, and infers a most restrictive data type by analyzing the data types of the keywords.

An alternative implementation of the algorithm avoids computation of Mf for each node. In one such implementation, the DAG is traversed from the bottom up so that the root node is data type "Null" and the bottom node is "U". The algorithm traverses the DAG using a breadth-first search algorithm to select a node associated with a most restrictive data type for a given set of keywords. The breadth-first search algorithm is a search algorithm that explores all child nodes before exploring descendants of the first child node. Given the "contains" type relationship between some nodes in the DAG, if Di is an ancestor of Dj, then if Dj(k)=True then Di(k)=True. Thus, according to this embodiment, if a keyword matches a particular data type, determining whether the keyword matches an ancestor of that data type is a redundant operation.

Continuing with the same example, in this embodiment, the algorithm determines Mf(Word)=80%, which exceeds the threshold of 75%. Therefore, the algorithm does not traverse to the parent node of "Word", "String", to determine the Mf for "String". This embodiment determines the most restrictive data type with the minimum number of computations.

B. Rules Generation

Given the inferencing of a data type, a number of different applications of this information may be provided. In one embodiment, the data type information is used to filter incoming messages by determining whether the values for the fields have the appropriate data type. Again it should be appreciated that this data type checking does not rely on any apriori knowledge about the data types of each field of a message, but instead on the inferenced data type information. Thus, in this embodiment, once the most restrictive data type for the component is identified, learning engine 350 generates rules, which would allow messages having the components that match the most restrictive data type to pass through security gateway 130. Since the most restrictive data type defines a data type of components as narrowly as possible, the generated rules make it more difficult for an intruder to guess a proper data type of a component. Since the most restrictive data type defines a data type of values for the each field as narrowly as possible, the generated rules will make it more difficult for an intruder to guess a valid data type of a value. Since messages that have values that do not match the most restrictive data type are likely to represent malicious attacks, the more narrowly the data type of values is defined, the greater the number of illegitimate messages that will be blocked from passing through application proxies and gateways. Accordingly, the generated rules will prevent a maximum number of illegitimate messages from passing through application proxies and gateways.

Continuing with the same example, the algorithm identified data type "Word" as the most restrictive data type of component "CityName." The generated rule is shown below in Table 2:

TABLE 2

Rule for Type-Field Messages

| Field Name | Most Restrictive Data Type |
|---|---|
| City Name | Word |

A rule may be constructed such as IF !(WORD(City_Name)) THEN REJECT

Learning engine 230 provides the generated rules to message filter 210. Message filter 210 applies the rules to determine whether to allow messages having values of the same field name that match the most restrictive data type.

It should be understood that although the algorithm was described in the context of field-type messages, such as XML formatted messages, this algorithm is applicable to data type inferencing of components of various types of messages, such as URL requests. Below is the description of the method of inferencing data types for URL messages.

URL Messages

At this point it will be useful to explain a structure of a typical URL. Assume that learning engine 230 receives the following URLs:
- "http://www.cnn.com/2004/Jan/1/sports.html"
- "http://www.cnn.com/2003/Jan" and
- "http://www.cnn.com/2002/Dec".

Each URL string is a combination of the protocol, such as "HTTP://", a host domain name, such as "www.cnn.com", and a directory path, such as "2004/Jan/1/sports". Each of the protocol, host domain name, and directory path are URL components. The directory path has one or more URL components, such as "2004," "Jan," "1," and "sports". The directory path may end with a suffix, such as ".html," which indicates the coded format language used to create hypertext documents. The URL components of a directory path are in a hierarchical relationship with each other. For example, in the URL identified by the path www.cnn.com/2004/Jan1/sports.html, component "2004" is of a higher level than component "Jan." Similarly, component "Jan" is of a higher level than component "1." Higher level components are in an ancestor-descendants relationship with lower level components. For example, component "2004" is a parent of component "Jan" and component "Jan" is a child of component "2004." The host domain name component is a root URL component. Components "2004", "2003", and "2002" are components of the same level. Similarly, components "Jan", "Jan", and "Dec" are of the same level.

Learning engine 230 extracts URL components from the messages. Learning engine 230 determines for URL components at the same level for the selected messages with the same root URL component a most restrictive data type for the URL component. This is performed by using a scalar data type inferencing algorithm described earlier. Learning engine 230 generates a rule which would allow messages with the URL components that match the most restrictive data type.

Continuing with the same example, the URLs are:
"http://www.cnn.com/2004/Jan/1/sports.html"
"http://www.cnn.com/2003/Jan/" and
"http://www.cnn.com/2002/Dec".

Learning engine 230 extracts the following components:
Level 1: {"2004", "2003", "2002"}
Level 2: {"Jan", "Jan", "Dec"}
Level 3 {"1"}
Level 4 {"sports"}

Learning engine 230 determines a most restrictive data type for URL components at the same level. For example, to determine a most restrictive data type for the Level 1 components, learning engine 230 provides Level 1 components to the algorithm.

Referring now to FIG. 4, initially, the algorithm computes a match factor for each data type. The match factor is a fraction of components in the set of components {"2004", "2003", "2002"} that match a particular data type. The result of the computation is as follows:

Mf (U)=100% because all components are of data type "U".
Mf (String)=100% because all components are of data type "String".
Mf (Word)=0% because no component is of data type "Word".
Mf (INT)=100% because all components are of data type "INT".
Mf (Credit Card)=0% because none of the components are of this data type.
Mf (Date)=0% because none of the components are of this data type.
Mf (Null)=0% because no components are of data type "Null".

The threshold is determined as 75%. Since Mf (INT) exceeds the threshold and "INT" does not have child data types that exceed the threshold, "INT" is the most restrictive data type for the set of components: ("2004", "2003", "2002"). The generated rule is shown in Table 3 below:

TABLE 3

Rule for URL messages

| URL root component | Level/Most Restrictive Data type |
|---|---|
| www.cnn.com | Level 1/INT |

For URLs with a root component "www.cnn.com", URL components at the first level should match data type "INT". This rule is provided to message filter 210, which will apply the rules to determine whether to allow messages having components that match the most restrictive data type.

It should be noted that inferencing a data type of a scalar object to find a most restrictive data types has many applications. As previously described, in one application, the algorithm of identifying the most restrictive data type for message components is used to generate rules/constraints that are applied to filter web application traffic.

In another application, the algorithm is used to generate exception rules to the rules which would otherwise block legitimate traffic, as described in a co-pending application "Using Statistical Analysis to Generate Exception Rules to Allow Legitimate Messages to Pass Through Application Proxies and Gateways," which disclosure is incorporated herein by reference.

While the algorithm of data type inferencing of scalar objects was described in the context of message filtering, it should be born in mind that the algorithm can be suited in any situation where data needs to be categorized. More generally, the algorithm is beneficially, but not exclusively, used where there is a defined set of types, topics, categories to be applied to a set of data, such as set of labels, keywords, or other entities, where the topics etc. have at least a partial ordering relationship, where the mapping of types to the labels is not known a priori, such as from an external category definition or mapping, and where the labels are associated with data values that may vary over time. The algorithm is applicable where the data is being received serially over time, or where the data is being analyzed in batch. Those of skill in the art will appreciate the wide variety of different applications which have these characteristics.

The present invention has been described in particular detail with respect to the two possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method of a device for generating a rule to filter messages routing across a network, the method comprising:
    (a) identifying, by an engine executing on a device during a learning mode, a plurality of uniform resource locator (URL) components from URLs in messages received via a network, the plurality of URL components identified at a same hierarchical level within their corresponding URLs;
    (b) selecting, by the engine, a most restrictive data type for the plurality of URL components identified at the same hierarchical level;
    (c) determining, by a filter executing on the device during a filtering mode, if a URL component of a received message from the same hierarchical level matches the most restrictive data type; and
    (d) allowing, by the filter, the received message to pass in response to a determination that the corresponding URL component matches the most restrictive data type selected.

2. The method of claim 1, further comprising generating, by the engine, a rule allowing messages with a URL component identified at the same hierarchical level having a data type that matches the most restrictive data type to pass.

3. The method of claim 2, further comprising applying the rule to the received message to determine whether to allow the received message to pass.

4. The method of claim 1, wherein identifying further comprises identifying the plurality of URL components from messages received via the network over a predefined duration.

5. The method of claim 1, wherein identifying further comprises identifying the plurality of URL components from a predefined number of messages received via the network.

6. The method of claim 1, further comprising maintaining, for each of a plurality of data types, a count of received messages with an identified URL component having the corresponding data type.

7. The method of claim 6, wherein determining further comprises:
    determining that the number of identified URL components having a data type that matches a first data type exceeds a threshold, the first data type selected from the plurality of data types; and
    selecting the first data type as the most restrictive data type.

8. The method of claim 7, wherein the threshold is based on a fraction of the plurality of identified URL components that should have a data type matching the most restrictive data type.

9. The method of claim 7, further comprising determining that a count of the identified URL components having a data type that matches a child data type does not exceed the threshold, wherein the identified URL components having a data type that matches the child data type is a subset of the URL components having a data type that matches the first data type.

10. The method of claim 6, further comprising representing the plurality of data types as nodes of a hierarchical graph, each node storing a count of the identified URL components having a data type that matches a data type corresponding to the node.

11. A device for generating a rule to filter messages routing across a network, the device comprising:
    a processor;
    an engine executing on the processor of the device during a learning mode, identifying a plurality of uniform resource locator (URL) components at a same hierarchical level from URLs in messages received via a network, and selecting a most restrictive data type for the plurality of URL components identified at the same hierarchical level; and
    a filter executing on the device during a filtering mode, determining if a URL component of a received message from the same hierarchical level matches the most restrictive data type, and allowing the received message to pass in response to a determination that the corresponding URL component matches the most restrictive data type selected.

12. The device of claim 11, wherein the engine generates a rule allowing messages with a URL component identified at the same hierarchical level having a data type that matches the most restrictive data type to pass.

13. The device of claim 12, wherein the filter applies the rule to the received message to determine whether to allow the received message to pass.

14. The device of claim 11, wherein the engine identifies the plurality of URL components from messages received via the network over a predefined duration.

15. The device of claim 11, wherein the engine identifies the plurality of URL components from a predefined number of messages received via the network.

16. The device of claim 11, wherein the engine maintains, for each of a plurality of data types, a count of received messages with an identified URL component having the corresponding data type.

17. The device of claim 16, wherein the engine determines that the number of identified URL components having a data type that matches a first data type selected from the plurality of data types exceeds a threshold, and selects the first data type as the most restrictive data type.

18. The device of claim 17, wherein the threshold is based on a fraction of the plurality of identified URL components that should have a data type matching the most restrictive data type.

19. The device of claim 17, wherein the engine determines that a count of the identified URL components having a data type that matches a child data type does not exceed the threshold, the identified URL components having a data type that matches the child data type is a subset of the URL components having a data type that matches the first data type.

20. The device of claim 16, wherein the engine represents the plurality of data types as nodes of a hierarchical graph, each node storing a count of the identified URL components having a data type that matches a data type corresponding to the node.

* * * * *